April 23, 1963  D. H. BAUMHART  3,086,238
ELECTRIC MOTOR SPEED CONTROLLER
Filed Oct. 18, 1961  2 Sheets-Sheet 1
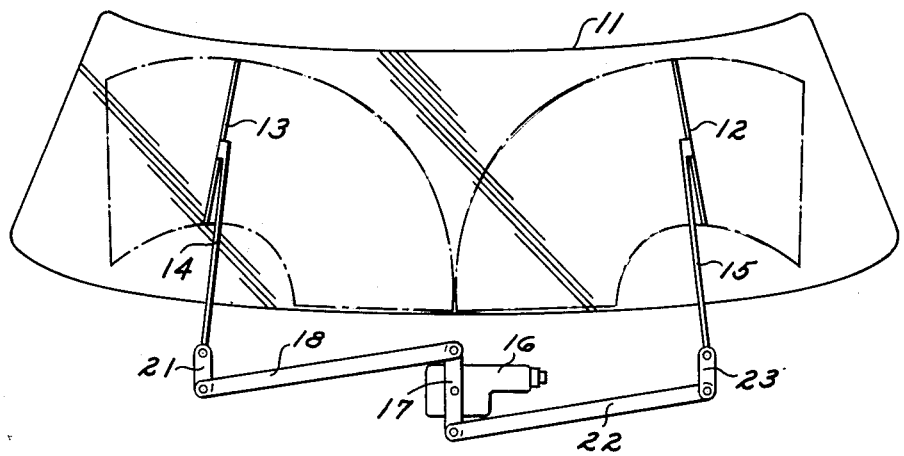
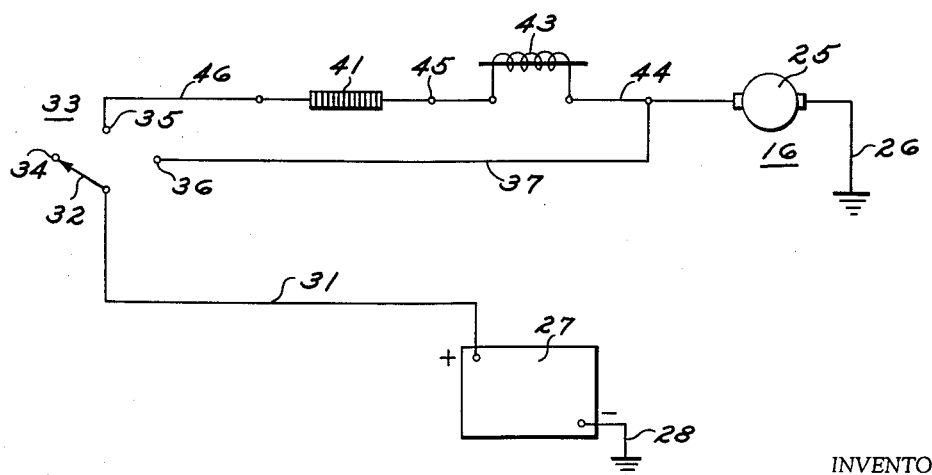
INVENTOR.
DONALD H. BAUMHART
BY
J. R. Faulkner
K. L. Zerschling
ATTORNEYS

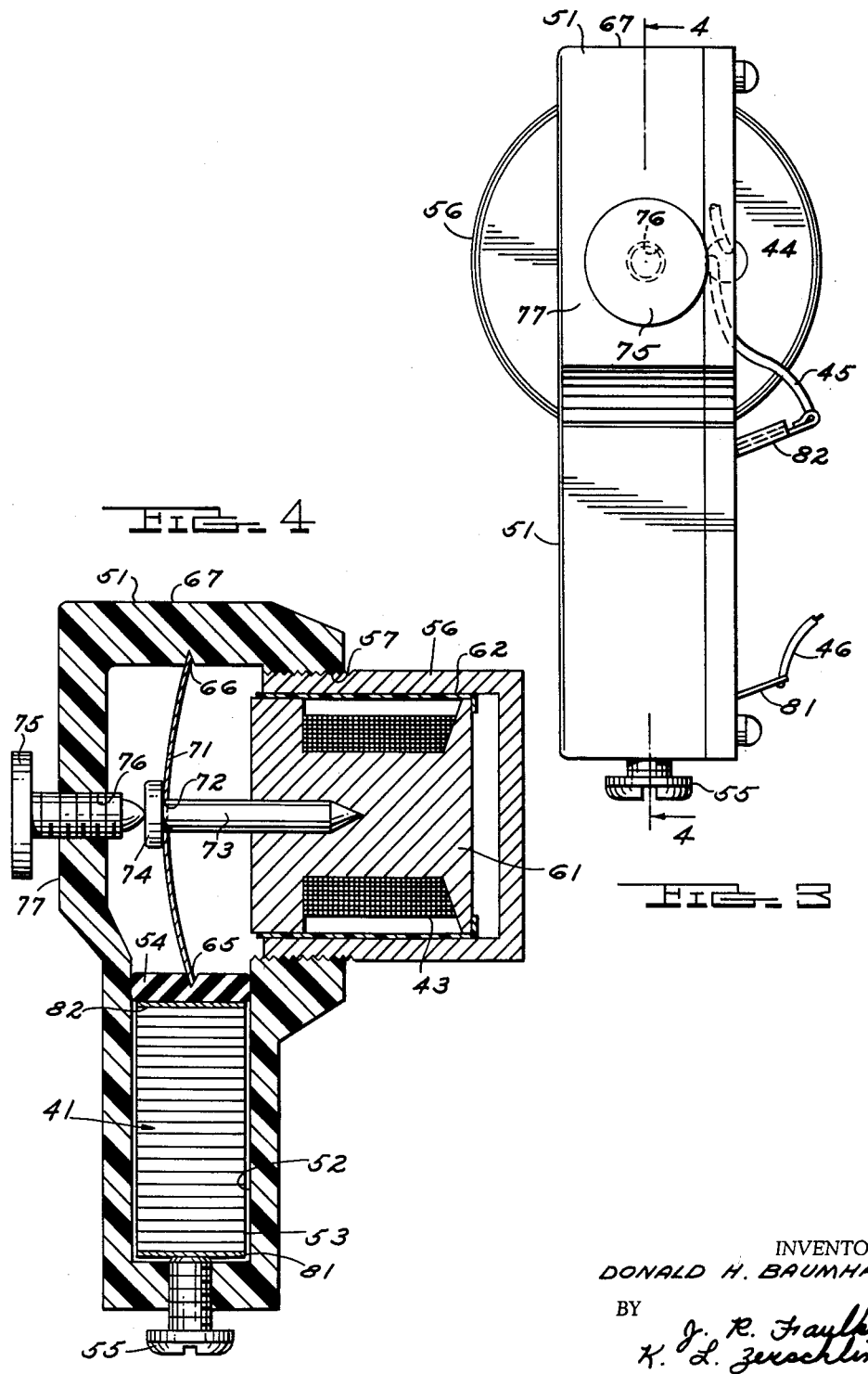

United States Patent Office 3,086,238
Patented Apr. 23, 1963

3,086,238
ELECTRIC MOTOR SPEED CONTROLLER
Donald H. Baumhart, Livonia, Mich., assignor to Ford Motor Company, Dearborn, Mich., a corporation of Delaware
Filed Oct. 18, 1961, Ser. No. 145,802
11 Claims. (Cl. 15—250.12)

This invention relates to a control circuit for an electric motor and more particularly to a control circuit for an electric motor in which a resistance in series with the motor is varied in response to changes in current drawn by the motor.

Although not so limited, the invention is particularly useful in an electric windshield wiper system for automotive vehicles that employ electric motors having permanent magnet fields. The speed of the permanent magnet motor cannot be changed by varying the field excitation as is done normally with two-speed electric windshield motors employing wound fields. A speed change can be accomplished, however, by connecting a resistor in series with the armature of the motor. This is satisfactory if the electric motor operates at a reasonably constant load, but if the load varies over a wide range, the speed change may be too severe and the motor may stall. In an automotive vehicle electric windshield wiper, the load on the electric motor and the current drawn thereby may increase tenfold in going from a wet wiping load to a much heavier damp-dry load. In a wet wiping load or condition, the water on the windshield acts as a lubricant and very little resistance is encountered in moving the wiper blades across the windshield. If the windshield is dry or damp, however, the lubricant is not present and it takes much more power to move the wiper blades across the windshield than under wet wiping conditions. If a two ohm resistor were employed in series with the armature of the electric motor and the electric motor draws one ampere during wet wiping conditions, it may draw 6 amperes during damp-dry load conditions. In the latter condition the voltage drop across the resistor would be 12 volts, the normal terminal voltage of present day automotive vehicle batteries. As a result, the electric motor would stall and the windshield wipers would fail to function.

The present invention overcomes this difficulty by providing a means responsive to the current drawn by the armature for decreasing the resistance of the resistor as an inverse function of the magnitude of the current. Or, stated differently, the invention provides a means responsive to the current drawn by the motor for decreasing the resistance in series with the motor when the current drawn by it increases. Thus, the voltage drop across the resistor is maintained at a value below the terminal voltage of battery—preferably at a substantially constant voltage—so that the motor does not stall due to an increase in the current drawn under damp-dry load conditions.

In the preferred embodiment of the invention, this is accomplished by employing a carbon pile resistor in series with the armature of the windshield wiper motor. A solenoid is positioned in series with the carbon pile resistor and means actuated by the solenoid are employed to increase the force on the carbon pile thereby decreasing its resistance in response to increases in the current drawn by the electric motor. This means preferably takes the form of a bowed or elliptical spring that has one end engaging the carbon pile resistor and has the other end fixed with respect thereto. The solenoid has an armature that is connected to the central portion of the spring and as the current flow increases the armature moves to lengthen the spring and to thus increase the force exerted on the carbon pile.

An object of the invention is to provide a control circuit for an electric motor that will prevent the motor from stalling under heavy load conditions.

Another object of the invention is the provision of a control circuit for an electric motor in which a resistor in series with the motor is varied as an inverse function of the current drawn.

A further object of the invention is the provision of a control circuit for an electric motor in which a variable resistor positioned in series with the motor has its resistance decreased as the current drawn by the motor is increased.

Still another object of the invention is the provision of a means for varying the resistance of a carbon pile resistor positioned in series with an electric motor as an inverse function of the current drawn by the electric motor.

A further object of the invention is to provide a windshield wiper system for an automotive vehicle in which a resistance placed in series with the electric motor employed to drive the system is varied inversely to the load applied to the motor by the windshield wiper blades.

Other objects and attendant advantages of the present invention will become more fully apparent as the specification is considered in connection with the attached drawings in which:

FIG. 1 is a schematic diagram of a windshield wiper system that may incorporate the present invention;

FIG. 2 is a circuit diagram of the present invention;

FIG. 3 is a side elevational view of a structure incorporated in the present invention for varying the pressure on a carbon pile resistor, and FIG. 4 is a sectional view partially in elevation taken along the lines 4—4 of FIG. 3.

Referring now to the drawings in which like reference numerals designate like parts throughout the several views thereof, there is shown in FIG. 1 a schematic of a windshield wiper mechanism that may employ the present invention. It is to be understood that the control circuit of the invention, although particularly adapted for use in a windshield wiper mechanism, is not limited thereto but may readily be employed as a control circuit for any electric motor. In FIG. 1 there is shown a windshield 11 having windshield wiper blades 12 and 13 positioned to wipe the windshield in the pattern shown. These blades are supported by arms 14 and 15 and the arms are driven in an oscillating fashion by an electric motor 16. The electric motor 16 drives a link 17 in an oscillating manner, and the link 17 in turn drives arm 14 through bar 18 and link 21 and drives arm 15 through bar 22 and link 23. This is a conventional windshield linkage mechanism and a further description is considered to be unnecessary.

A circuit diagram of the electrical system for energizing the electric motor 16 is shown in FIG. 2. The motor 16, as shown, is a direct current type having a non-variable field, preferably a permanent magnet field. The armature 25 of the motor has one terminal grounded through lead 26. The other terminal of the armature is energized by means of an electrical storage battery, generally designated by the numeral 27. One terminal of the storage battery is connected to ground by lead 28 while the other terminal is connected through a lead 31 to a movable arm 32 of a three-position switch 33. This three-position switch has three contacts, designated by the numerals 34, 35 and 36.

When the arm 32 makes connection with the terminal 34, the motor 16 will not be energized and the windshield wipers will be in the "Park" position. When the arm 32 is moved into connection with the contact 36 the motor 16 is energized through the lead 37, and thus it operates at its higher speed. The motor 16 may be operated at its lower speed by moving the arm 32 into connection with the contact 35. In this position the motor 16 is energized from the movable arm 32 through a carbon pile resistor 41 and a solenoid 43. The armature 25 of electric motor 16, the solenoid 43, the carbon pile resistor 41 and the contact 35 are connected in series by the leads 44, 45 and 46. Thus, during high speed operation of the electric motor 16 the armature 25 is energized directly from the battery 27 by means of lead 31, movable arm 32, and lead 37. When the motor is operated at its lower speed the armature 25 is energized from the battery 27, through lead 31, movable arm 32, contact 35, lead 46, carbon pile resistor 41, lead 45, solenoid 43 and lead 44.

As stated previously the invention provides means for varying the resistance of the carbon pile 41 as an inverse function of the current drawn by the armature 25. This is accomplished through the action of the solenoid 43. Referring now to FIGS. 3 and 4, the structure for accomplishing this function is disclosed. This structure includes a housing 51 constructed of any stiff insulating material, for example, a phenolic molding compound. This housing includes a well-type portion 52 that receives a plurality of carbon discs 53 that form the carbon pile resistor 41. A button 54 of insulating material is positioned at one end of the carbon pile while an adjusting screw 55 protrudes through the housing into engagement with the other end of the carbon pile. This adjusting screw is employed to compensate for maufacturing tolerances and to set the initial resistance of carbon pile resistor 41. A cylindrical casing 56 constructed of magnetic material is threadingly received in an aperture 57 in the housing 51. A solenoid armature 61 is slidably positioned within the casing 55 through the medium of a nonmagnetic sleeve 62 constructed of a self-lubricating material, for example, Teflon. This sleeve is positioned around the armature 61 and in contact with the casing 56. The solenoid 43 is wound about the armature 61.

It can be readily seen from an inspection of FIG. 4 that the axis of the carbon pile resistor 41 is substantially perpendicular to the axes of the solenoid 43, the armature 61 and the casing 56. The button 54 has a slot 65 positioned therein in a direction substantially perpendicular to the axes of the solenoid 43, the armature 61 and the casing 56, and it is arranged so that it passes through the axis of the carbon pile resistor. The housing 51 has a groove 66, positioned in a wall 67 that is spaced from the button 54. The groove 66 is positioned similarly to the groove 65 with respect to its alignment in relation to the axis of the carbon pile resistor 41 and the axes of the solenoid 43, the armature 61 and the casing 56.

A bowed spring 71, preferably of elliptical form, has one end positioned in groove 65 and another end positioned in groove 66. This spring has a central aperture 72 for receiving a pin 73 having an enlarged head 74. The main body of the pin is connected to the armature 61 by and suitable means, for example, by press fitting. An adjusting screw 75 threadingly engages an aperture 76 positioned in wall 77 of the housing 51 and one end thereof engages the enlarged head 74 of pin 73.

As can be seen by reference to FIGS. 3 and 4, the carbon pile resistor 41 has a pair of terminals 81 and 82 positioned at either end. These terminals extend through the housing 51 and provide a means for connecting the carbon pile resistor in the circuit. The terminal 81 is connected to the lead 46 while the terminal 82 is connected to the lead 45. FIG. 3 also discloses the lead 44 that connects the solenoid 43 with the armature 25 of the motor 16.

In operation of the invention, the windshield wipers may be operated at their high speed by connecting the movable arm 32 of switch 33 to the contact 36. When the windshield wiper is to be operated at a lower speed the arm 32 is connected to the contact 35 and the motor is energized through the carbon pile resistor 41. This decreases the speed of the motor by adding a resistance in series with it. As previously pointed out, this circuit alone would be satisfactory in providing two speed operation of the windshield wipers under wet-pipe conditions in which a liberal amount of water is present on the windshield. During damp-dry conditions, however, the load on the electric motor increases because of the increased resistance to movement of the windshield wiper blades across the windshield. This increase in resistance is due to the lack of water as a lubricant during the damp-dry conditions. Under these circumstances, the motor armature 25 draws an increased current and if the resistance were to remain at a constant value the voltage drop across it could reach the terminal voltage of the battery 27 thus causing a stalling condition of the armature.

The carbon pile resistor 41 with its property of having its resistance decreased with an increase in pressure provides a means for preventing such stalling action. As previously pointed out, the solenoid 43 is in series with the armature 25 of the motor and when the current drawn by the motor increases, the magnetic flux present in the magnetic circuit composed of solenoid 43, armature 61 and casing 56 also increases. This increase in magnetic flux increases the attractive force between the armature 61 and the end wall of casing 56. As a result, the solenoid armature 61 is moved to the right in FIG. 3 so that it reduces the air gap between itself and the end wall of the casing 56. Such action moves the center of bowed or elliptical spring 71 to the right and thus causes it to straighten. Such an action increases the pressure of the spring on the carbon pile resistor 41 and decreases its resistance thereby further increasing the current flow through the armature 25. This action is accumulative until a balance of the current drawn and the demand for this current occasioned by the load on the motor has been reached.

It can be appreciated that the compressive force exerted upon the carbon pile 41 by the spring 71 is a multiple of the closing force between the armature 61 and the end of casing 56. A mechanical advantage of 7 to 1 may be achieved since the center of spring 71 may be designed to move 7 times the distance moved by the end of the spring. The spring 71 will return the armature 61 to its initial position after the current flow through the solenoid 43 and the armature 25 of motor 16 has been reduced to zero or to some other selected value. By this mechanism the resistance of the carbon pile resistor 41 can be varied by as much as 40 to 1 with a system designed for use with a two-speed electric windshield wiper for an automotive vehicle.

The operator of the vehicle may adjust the initial resistance of the carbon pile resistor 41 and thus set the speed at which the windshield wiper will operate when it is set for low speed operation. This can be done by adjusting the screw 75 which in turn operates to move the center of spring 71 either to the left or to the right thereby either increasing or decreasing the resistance of carbon pile 53. This adjusting feature is in addition to the screw 55 that may be employed at the factory to compensate for manufacturing tolerances and to set an initial resistance for carbon pile resistor 41.

It can be appreciated that the invention not only provides a suitable control system for a windshield wiper system that employs a permanent magnet electric motor, but that it provides a control circuit for an electric motor that may be employed to vary a resistance positioned in series with the motor as an inverse function of the current drawn.

It will be understood that the invention is not to be limited to the exact construction shown and described, but that various changes and modifications may be made without departing from the spirit and scope of the invention as defined in the appended claims.

I claim:

1. In an electric circuit the combination comprising, an electric motor having an armature, a variable resistor positioned in series with the armature of said electric motor, and means responsive to the current drawn by said armature for varying the resistance of said variable resistor as an inverse function of the current drawn by said armature.

2. In an electric circuit the combination comprising, an electric motor having a nonvariable field and an armature, a variable resistor positioned in series with the armature of said electric motor, and means connected in series with said variable resistor and the armature of said electric motor for decreasing the resistance of said variable resistor in response to an increase in the current drawn by the armature of said electric motor.

3. In an electric circuit the combination comprising, an electric motor having a nonvariable field and an armature, a carbon pile resistor connected in series with the armature of said electric motor, and means responsive to the current drawn by said armature for varying the resistance of said carbon pile resistor as an inverse function of the current drawn.

4. In an electrical circuit the combination comprising, an electric motor having a permanent magnet field, a carbon pile resistor connected in series with said electric motor, and means connected in circuit with said carbon pile resistor and said electric motor for varying the pressure exerted on said carbon pile as a function of the current drawn by said electric motor.

5. A control circuit for a permanent magnet motor comprising, a carbon pile resistor connected in series with said motor, a solenoid connected in series with said permanent magnet motor and said carbon pile resistor, and means actuated by said solenoid and engaging said carbon pile resistor for increasing the pressure applied to said carbon pile resistor in response to an increase in the current drawn by said permanent magnet motor.

6. A control circuit for an electric motor having a permanent magnet field and an armature, a carbon pile resistor connected in series with said armature, a solenoid connected in series with said armature and said carbon pile resistor, and means actuated by said solenoid and engaging said carbon pile resistor for increasing the pressure applied to said carbon pile resistor in response to an increase in the current drawn by said armature.

7. In a control circuit for an electric motor having a permanent magnet field and an armature, a carbon pile resistor connected in series with the armature of said motor, a solenoid connected in series with the carbon pile resistor and with the solenoid, the axis of said solenoid being positioned at substantially right angles to the axis of said carbon pile resistor, a housing enclosing said carbon pile resistor and said solenoid, a bowed spring having one end engaging said casing and the other end engaging said carbon pile, means engaging said bowed spring and actuated by said solenoid for straightening said bowed spring in response to an increase in current drawn by said armature and flowing through said solenoid, whereby the pressure on said carbon pile is increased and the resistance thereof is decreased in response to an increase in current drawn by said armature.

8. In a control circuit for an electric motor having a permanent magnet field and an armature, a carbon pile resistor connected in series with the armature of said motor, a solenoid connected in series with the carbon pile resistor and with the armature of said motor, a housing constructed of insulating material, said carbon pile resistor being positioned within said housing, a solenoid armature having said solenoid wound thereupon, a casing constructed of magnetic material receiving said solenoid and said solenoid armature, a sleeve of nonmagnetic self-lubricating material positioned between said solenoid armature and said casing, said casing being affixed to said housing with the axes of said casing, said solenoid and said solenoid armature being positioned in a substantially perpendicular direction with respect to the axis of said carbon pile resistor, a button constructed of insulating material positioned on the end of the carbon pile adjacent said casing, said button having a groove positioned therein extending in a direction substantially perpendicular to the axes of said solenoid, said solenoid armature and said casing, said casing having a groove positioned therein aligned with the groove in said button, a spring bowed in a direction away from the said solenoid and said solenoid armature and having its ends positioned within said grooves, a pin coupled to the central portion of said spring and to said solenoid armature, said solenoid and solenoid armature being positioned within said casing such that an air gap exists between one end of said armature and the end of said casing remote from said spring, said solenoid armature moving to close the air gap in response to an increase in current drawn by said armature and flowing through said solenoid thereby increasing the force applied by said spring to said carbon pile, whereby the resistance of said carbon pile is decreased in response to an increase in current drawn by said armature.

9. The combination of claim 8 that is further characterized by an adjusting screw extending through said housing and engaging the central portion of said spring whereby the initial force on said carbon pile resistor and the initial resistance of said carbon pile resistor can be set.

10. In an automotive vehicle, a windshield, a pair of windshield wiper blades positioned against said windshield, an electric windshield wiper motor having a permanent magnet field and an armature, linkage means interconnecting said armature with said windshield wiper blades, a source of electrical energy, a carbon pile resistor, a solenoid, said source of electrical energy, said carbon pile resistor, said solenoid and the armature of said electric motor being connected in series, and means actuated by said solenoid and engaging said carbon pile resistor for increasing the pressure upon said carbon pile resistor thereby decreasing the resistance of said carbon pile resistor in response to an increase in the current drawn by said armature as a result of an increase in resistance to the movement of said windshield wiper blades across said windshield.

11. In an automotive vehicle, a windshield, a pair of windshield wiper blades positioned against said windshield, an electric windshield wiper motor, linkage means interconnecting said electric windshield wiper motor with said windshield wiper blades, a source of electrical energy, a variable resistor connected in series with said source of electrical energy and said electric windshield wiper motor, and electrical means connected in series with said variable resistor for varying the resistance of said variable resistance as an inverse function of the current drawn by said electric motor, whereby the resistance of said variable resistance varies inversely as the load applied to the electric motor by said windshield wiper blades as said windshield wiper blades wipe said windshield.

References Cited in the file of this patent

UNITED STATES PATENTS

| | | |
|---|---|---|
| 1,163,960 | Turbayne | Dec. 14, 1915 |
| 1,361,675 | Bradley | Dec. 7, 1920 |
| 1,745,447 | Pesout | Feb. 4, 1930 |
| 2,721,352 | Oishei | Oct. 25, 1955 |
| 2,724,081 | De La Source | Nov. 15, 1955 |